United States Patent
Skweres et al.

(10) Patent No.: US 9,616,872 B2
(45) Date of Patent: Apr. 11, 2017

(54) ABDX-C SERVICE GRADUATING VALVE AND SLIDE VALVE AND SLIDE VALVE DESIGN INCORPORATING ACCELERATED APPLICATION VALVE (AAV) FUNCTIONALITY

(71) Applicant: WABTEC HOLDING CORP., Wilmerding, PA (US)

(72) Inventors: Jeffrey B. Skweres, McKeesport, PA (US); Gary M. Sich, Irwin, PA (US); Michael S. Plechey, Jeannette, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 21 days.

(21) Appl. No.: 14/397,281

(22) PCT Filed: May 8, 2013

(86) PCT No.: PCT/US2013/040119
§ 371 (c)(1),
(2) Date: Oct. 27, 2014

(87) PCT Pub. No.: WO2013/169891
PCT Pub. Date: Nov. 14, 2013

(65) Prior Publication Data
US 2015/0145323 A1 May 28, 2015

(51) Int. Cl.
*B60T 15/30* (2006.01)
*B60T 15/02* (2006.01)
(Continued)

(52) U.S. Cl.
CPC .......... *B60T 15/022* (2013.01); *B60T 13/665* (2013.01); *B60T 15/021* (2013.01); *B60T 17/228* (2013.01)

(58) Field of Classification Search
CPC ...... B60T 15/02; B60T 15/021; B60T 15/022; B60T 15/024; B60T 15/42
See application file for complete search history.

(56) References Cited

U.S. PATENT DOCUMENTS

| 2,804,354 A | 8/1957 | Cook |
| 3,208,801 A | 9/1965 | McClure |

(Continued)

FOREIGN PATENT DOCUMENTS

| CN | 87103564 A | 11/1987 |
| CN | 101959728 A | 1/2011 |

(Continued)

*Primary Examiner* — Nicholas J Lane
(74) *Attorney, Agent, or Firm* — The Webb Law Firm (57) ABSTRACT

A main piston assembly for a service valve portion of a brake control valve for a railway vehicle braking system includes a service graduating valve and a service slide valve. The graduating valve includes a first side having a porting pattern defined therein. The service slide valve includes a graduating valve seat having a porting pattern in a first side and a service slide valve face having a porting pattern in an opposing second side. The porting patterns of the first side of the graduating valve, the graduating valve seat, and the service slide valve face are configured to perform an accelerated application valve function venting brake pipe pressure to atmosphere and to direct pressure from an accelerated release reservoir to the service graduating valve to discontinue the accelerated application valve function when a slight brake pipe over-reduction condition exists.

19 Claims, 10 Drawing Sheets

(51) Int. Cl.
  *B60T 13/66* (2006.01)
  *B60T 17/22* (2006.01)

(56) References Cited

U.S. PATENT DOCUMENTS

| | | | |
|---|---|---|---|
| 3,429,620 | A | 2/1969 | Scott |
| 3,966,269 | A | 6/1976 | McEathron |
| 4,033,632 | A | 7/1977 | Wilson |
| RE29,722 | E | 8/1978 | McEathron |
| 4,378,950 | A | 4/1983 | Hart et al. |
| 4,690,463 | A | 9/1987 | Hart |
| 4,744,609 | A | 5/1988 | Weber, Jr. |
| 4,775,194 | A | 10/1988 | Vaughn et al. |
| 4,798,420 | A | 1/1989 | Rojecki |
| 4,974,910 | A | 12/1990 | Hart |
| 5,044,698 | A | 9/1991 | Hart et al. |
| 5,083,843 | A | 1/1992 | Engle |
| 5,213,397 | A * | 5/1993 | Troiani .................. B60T 15/42 303/33 |
| 5,429,427 | A | 7/1995 | Gayfer |
| 5,613,741 | A | 3/1997 | Shank |
| 6,135,573 | A | 10/2000 | Kushnir, Jr. et al. |
| 6,227,521 | B1 | 5/2001 | Scott et al. |
| 6,238,012 | B1 | 5/2001 | Santoro, Jr. et al. |
| 6,609,769 | B2 | 8/2003 | Hart et al. |
| 6,971,723 | B2 | 12/2005 | Engle et al. |
| 7,144,090 | B2 | 12/2006 | Kull et al. |
| 7,306,294 | B2 | 12/2007 | Hart et al. |
| 7,556,322 | B2 | 7/2009 | Veltri et al. |
| 7,980,637 | B2 | 7/2011 | Thomas |

FOREIGN PATENT DOCUMENTS

| | | | | |
|---|---|---|---|---|
| GB | 1064697 | A * | 4/1967 | ............ B60T 15/185 |
| WO | 2012040701 | A2 | 3/2012 | |

\* cited by examiner

ABDX-C SERVICE GRADUATING VALVE AND SLIDE VALVE AND SLIDE VALVE DESIGN INCORPORATING ACCELERATED APPLICATION VALVE (AAV) FUNCTIONALITY

CROSS REFERENCE TO RELATED APPLICATION

This application is the United States national phase of International Application No. PCT/US2013/040119 filed May 8, 2013, and claims priority from U.S. Provisional Patent Application No. 61/644,106, filed on May 8, 2012, the disclosures of which are incorporated herein by reference in their entirety.

BACKGROUND OF THE INVENTION

Field of the Invention

The present invention generally relates to a brake apparatus for railway vehicles and, more particularly, to a service graduating valve and service slide valve of a service portion of a brake control valve.

Description of Related Art

China Railways have a standardized pneumatic air brake valve, called "Type 120-1", which is similar in overall operation to American Association of Railroads (AAR) pneumatic air brake valves (such as the WABCO ABD), with a pipe bracket, service valve portion, and emergency valve portion. Testing performed on the Type 120-1 valves reveal that during specific maintained brake pipe reductions, the Accelerated Application Valve function (AAV) can find a position in which it will 'stick on' and, thus, not be able to properly shut down. Therefore, the Type 120-1 service valve portion will continue to exhaust brake pipe pressure locally at each freight car where this condition exists. When this occurs, this causes a further decrease in brake pipe pressure in the train and greatly increases the risks of undesired brake releases since the train's locomotive contains the pressure maintaining feature. Depending upon the number of service control valves that exhibit this undesirable function in a train consist, an increased risk of subjecting the train to an undesirable release condition exists. The AAV function helps to drive the brake pipe exhaust signal locally at each control valve, which therefore provides faster brake cylinder development during service brake applications. This function results in better overall train stopping ability and helps to stop longer and heavier freight trains in a more efficient manner.

Particularly, train tests performed on fifty 50-foot OEM 120-1 type control valve portions revealed that after a certain maintained brake pipe reduction, the AAV function would remain 'stuck on' and not shut off properly, even with the locomotive pressure maintaining feature. Train tests performed revealed as many as 40% of the cars having a 'stuck AAV' condition as observed during one particular test.

The effects of having AAV's 'stuck on' in a train will result in a further decrease in brake pipe pressure from its maintaining pressure state, which can, therefore, significantly increase the risk of undesired brake releases. Since the Chinese 120-1 type service valve's Service Accelerated Release (SAR) function is piloted by brake cylinder exhaust pressure, each time the control valve goes to the release position, the SAR function allows accelerated release reservoir pressure to dump back into the brake pipe locally on each car. When this function occurs, a significant increase in the risk of releasing the brakes on additional cars, or the entire train, exists because brake pipe pressure locally in the train is being increased. Train tests performed on fifty 50-foot car Chinese 120-1 type control valves did not reveal an undesired brake release when the AAV 'stuck on' condition was observed; however, the reason for this was due to the short train make-up of only 50 cars.

However, on longer trains, such as 7,500 feet or longer, there will be an increased risk of undesired brake releases if the AAV function 'sticks on', primarily due to the additional number of valves in the train possessing the AAV 'stuck on' issue. The greater number of service valves in a train having the AAV 'stuck on' issue will decrease brake pipe pressure further below from its 'maintaining' pressure state. Thus, when all the 'suspect' service valve portions in the train, which have an AAV 'stuck on' issue present, move from their service position to their boost position, the AAV function will be nullified. However, when this occurs, the pressure maintaining wave in the train is going to increase brake pipe back to its maintaining state, which, in turn, provides the proper dynamics to drive undesired brake releases. Any undesired brake release in a train consist, where potentially the entire train could possibly be undesirably released, is a major train handling safety issue that must be avoided at all costs.

SUMMARY OF THE INVENTION

Accordingly, there is a general need in the art for a brake control valve that incorporates the AAV function in the service valve portion in a manner compatible with the functions currently performed by the Chinese Type 120-1 control valve that eliminates the potential for AAV sticking issues such as is currently present in the Chinese Type 120-1 service grad valve/service slide valve design.

According to one embodiment, a main piston assembly, which consists of the service graduating valve and the service slide valve, is provided that incorporates the AAV function in the service valve portion of a brake control valve and initiates positive shutdown of the AAV function when a slight brake pipe pressure over-reduction condition is present.

According to one embodiment, when the main piston assembly of the service valve portion is in the full service position, brake pipe feed to the local reduction room port is cut off by additional graduating valve travel on its seat. In order to effectuate this operation, the graduating valve length is longer than in the Chinese Type 120-1 service graduating valve and the main piston assembly is correspondingly modified. The graduating valve face, graduating valve seat, and the slide valve face include separate AAV ports in order to vent brake pipe pressure to atmosphere with respect to only the AAV function while having no effect with respect to the 'preliminary quick service function' as opposed to being driven by the same ports as in the Chinese Type 120-1 service valve portion. According to one embodiment, both the preliminary quick service and AAV functions have been isolated from each other with now separate port sequencing/connections.

According to one embodiment, the graduating valve seat and the slide valve face each includes an accelerated release reservoir port in order to provide pressure from the accelerated release reservoir to the graduating valve face to ensure positive AAV shutdown. Also, according to one embodiment, the graduating valve face includes an accelerated release reservoir to auxiliary reservoir bleeder port in order to allow accelerated release reservoir pressure to flow into auxiliary reservoir pressure, thus moving the graduating valve to its full service position to disconnect the AAV function while the slide valve still remains in its full service position. In all service brake applications except for brake pipe over-reductions when the slide valve moves from its service position to its boost position, accelerated release reservoir pressure is higher than auxiliary reservoir pressure. Therefore, with the service slide valve in its service position, if a specific brake pipe over-reduction is made and the AAV function remains on because the main piston's tail-spring cannot move the graduating valve on its seat due to the differential bias across the main piston assembly at that time, the higher accelerated release reservoir pressure will flow into the auxiliary reservoir via the bleeder port in the graduating valve face. This will create a great enough pressure differential between the brake pipe and the auxiliary reservoir, thus permitting the main piston assembly to move the graduating valve on its seat to its full service position, thus ensuring positive shutdown of the AAV function.

According to one embodiment, the AAV choke, which is placed in the service slide valve of the Chinese Type 120-1 service valve portion, is incorporated into the service graduating valve. As a result, the AAV choke is machined into the less complex part. Thus, the service valve portion's AAV function can be specifically sized for various different brake pipe lengths (short or long car) just by providing graduating valves that have a different size AAV choke.

According to one particular embodiment, a main piston assembly for a service valve portion of a brake control valve is provided. The main piston assembly includes a service graduating valve having a body, the body of the service graduating valve including a first side having a porting pattern defined therein; and a service slide valve having a body, the body of the service slide valve including a first side with a graduating valve seat having a porting pattern defined therein and an opposing second side with a service slide valve face having a porting pattern defined therein. The porting pattern of the first side of the service graduating valve, the porting pattern of the graduating valve seat of the service slide valve, and the porting pattern of the service slide valve face of the service slide valve are configured to perform an accelerated application valve function venting brake pipe pressure to atmosphere and to direct pressure from an accelerated release reservoir to the service graduating valve to discontinue the accelerated application valve function.

According to another particular embodiment, a service valve portion of a brake control valve is provided. The service valve portion includes a body having a first side, a second side, and a piston passageway defined therein extending from the top side to the bottom side; a main bushing; and a main piston assembly movably disposed within the piston passageway. The main piston assembly includes a service graduating valve having a body, the body of the service graduating valve including a first side having a porting pattern defined therein; and a service slide valve having a body, the body of the service slide valve including a first side with a graduating valve seat having a porting pattern defined therein and an opposing second side with a service slide valve face having a porting pattern defined therein. The porting pattern of the first side of the service graduating valve, the porting pattern of the graduating valve seat of the service slide valve, and the porting pattern of the service slide valve face of the service slide valve are configured to perform an accelerated application valve function of venting brake pipe pressure to atmosphere and to direct pressure from an accelerated release reservoir to the service graduating valve to discontinue the accelerated application valve function when a slight brake pipe over-reduction condition exists.

According to yet another particular embodiment, a main piston assembly for a service valve portion of a brake control valve is provided. The main piston assembly includes a service graduating valve and a service slide valve. The service graduating valve and the service slide valve are mutually configured to perform an accelerated application valve function venting brake pipe pressure to atmosphere and to direct pressure from an accelerated release reservoir to the service graduating valve to discontinue the accelerated application valve function when a slight brake pipe over-reduction condition exists.

Further details and advantages of the various embodiments of the invention detailed herein will become clear upon reviewing the following detailed description of the preferred embodiments in conjunction with the accompanying drawing figures.

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
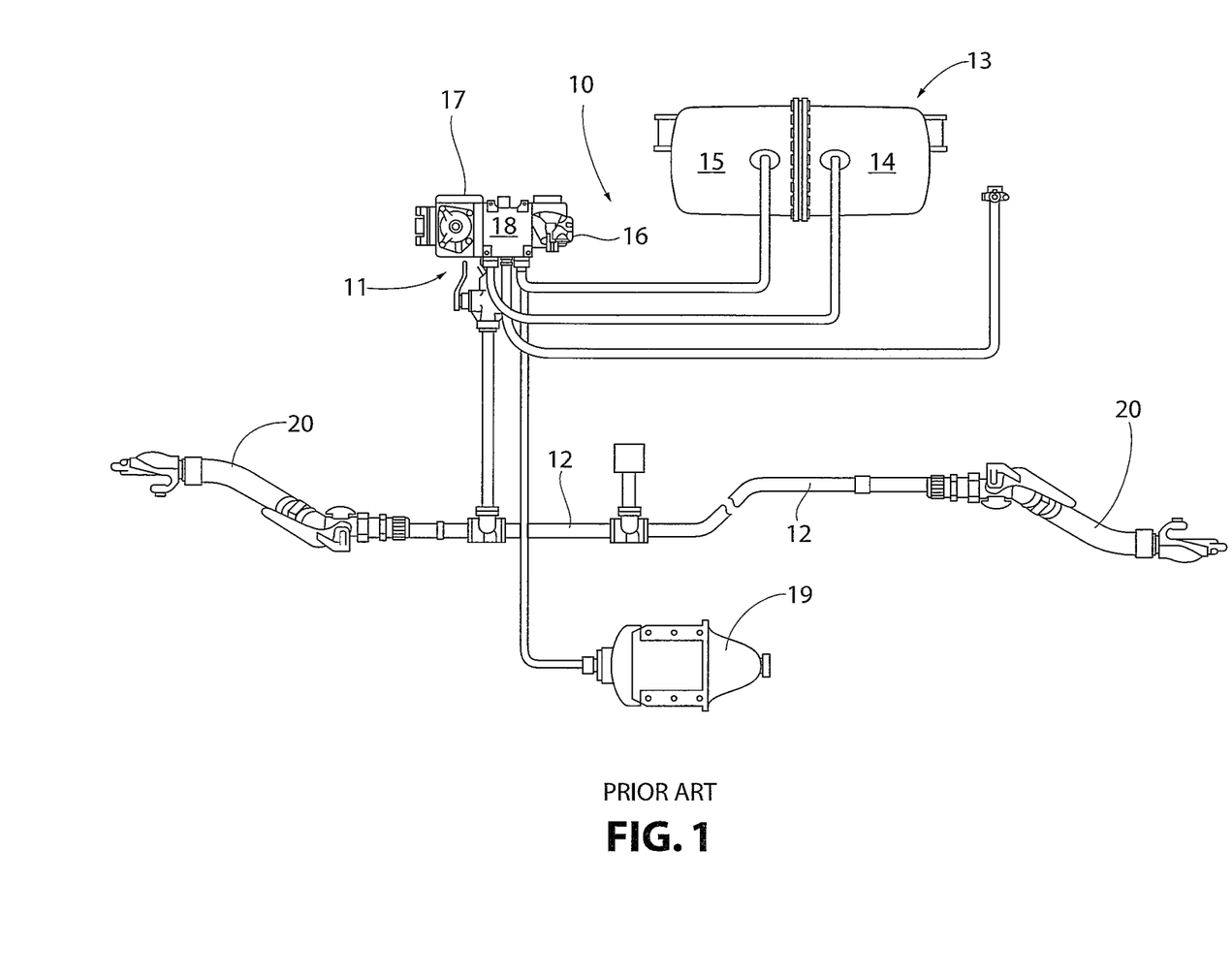
FIG. 1 is a schematic of a prior art brake control system for a freight car using an ABDX brake control valve.
Figure 2:
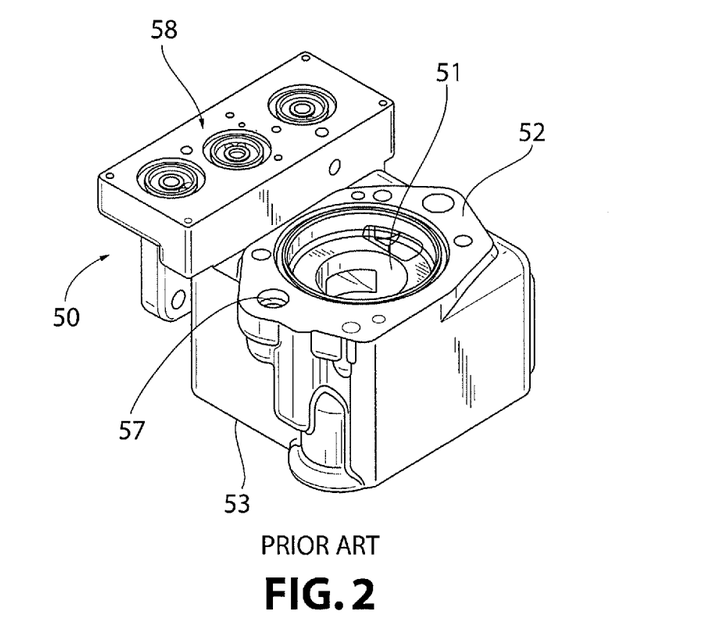
FIG. 2 is a front-top perspective view of a service portion body for a brake control valve according to one embodiment.
Figure 3:
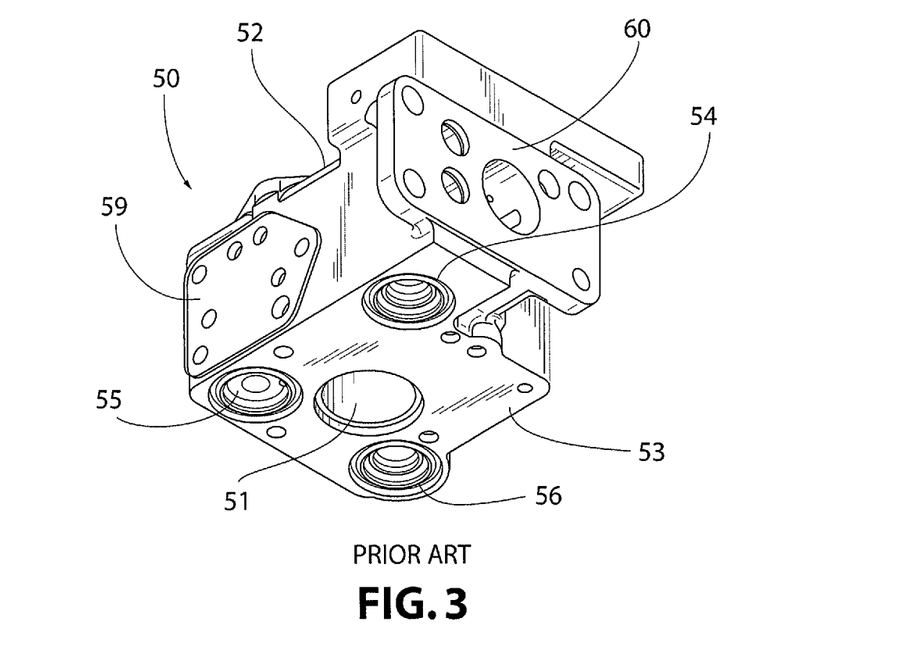
FIG. 3 is a rear-bottom perspective view of the service portion body shown in FIG. 2.
Figure 4:
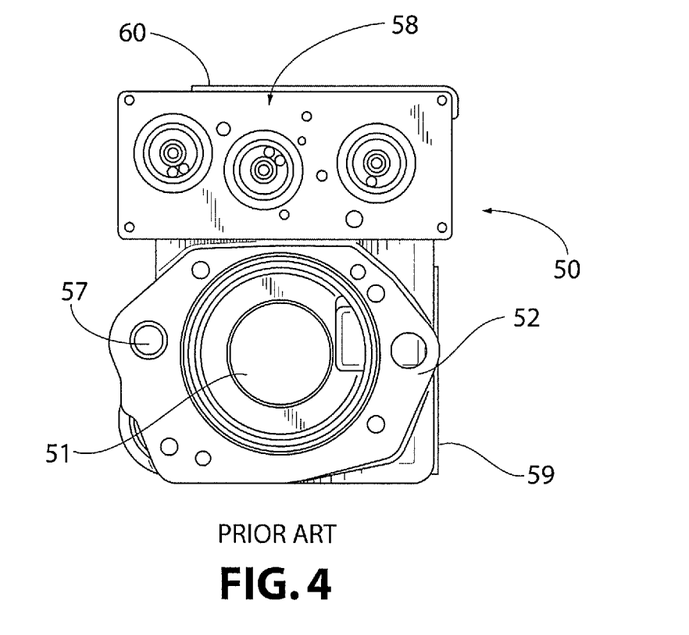
FIG. 4 is a top view of the service portion body shown in FIG. 2.
Figure 5:
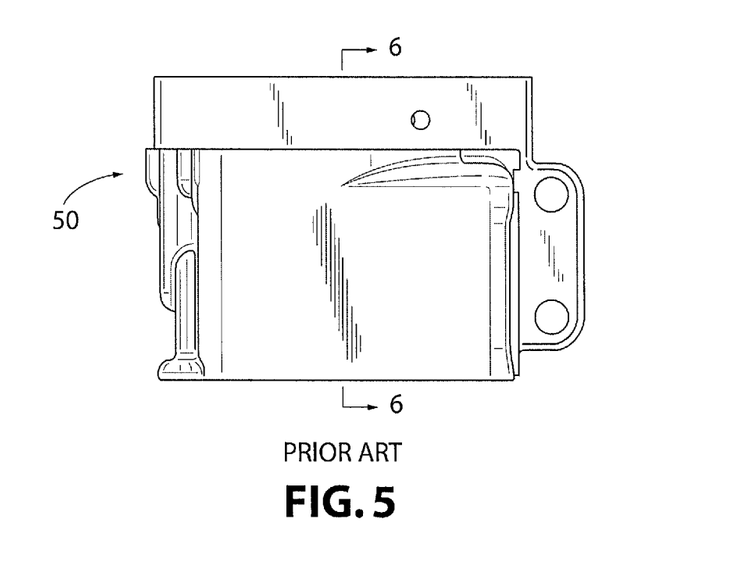
FIG. 5 is a front view of the service portion body shown in FIG. 2.
Figure 6:
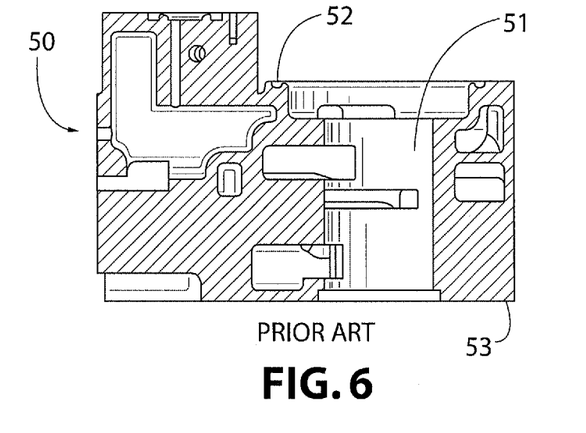
FIG. 6 is a cross-sectional view of the service portion body shown in FIG. 2 taken along line 6-6 in FIG. 5.
Figure 7:
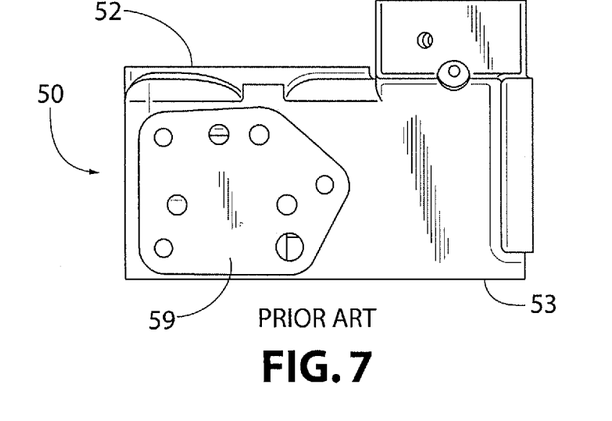
FIG. 7 is a side view of the service portion body shown in FIG. 2.
Figure 8:
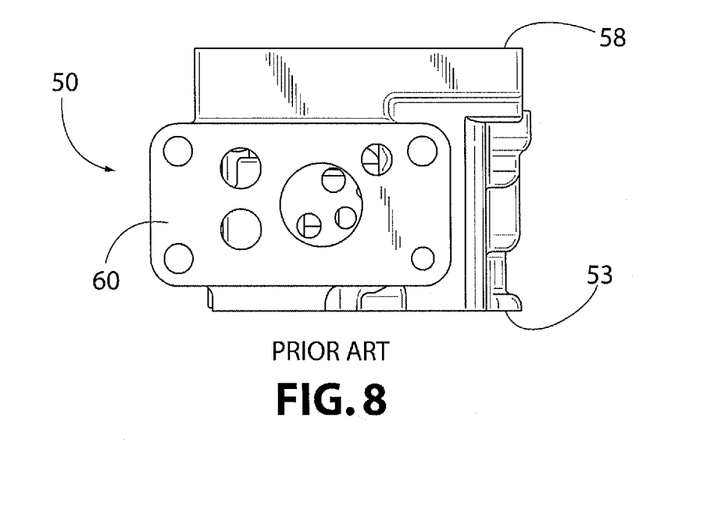
FIG. 8 is a rear view of the service portion body shown in FIG. 2.
Figure 9:
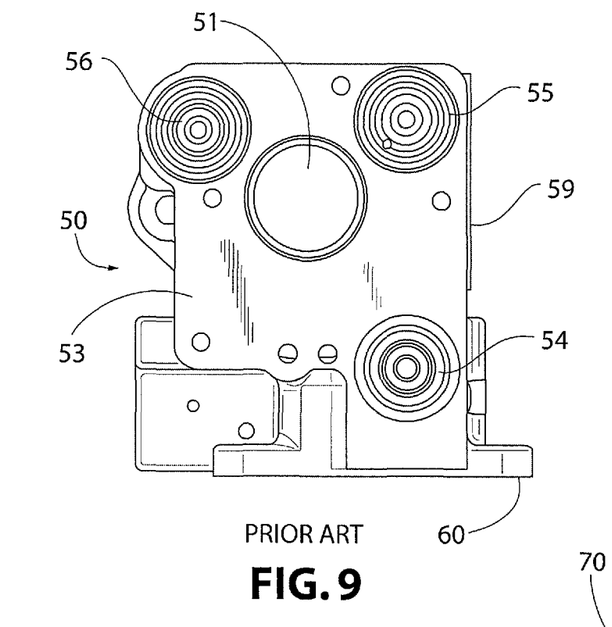
FIG. 9 is a bottom view of the service portion body shown in FIG. 2.

FIG. 1 illustrates a typical prior art type brake system 10 for a single railway freight car in which a brake control valve 11 is shown pneumatically interconnected between a brake pipe 12 of the car and a dual compartment reservoir 13 of compressed air located on the car. As is clearly shown, the reservoir 13 is comprised of two reservoirs, one is an auxiliary reservoir volume 14 and the other is an emergency reservoir volume 15. The auxiliary reservoir volume 14 and emergency reservoir volume 15 may be joined together as the single dual compartment reservoir 13. Though it should be noted that in China, two separate reservoirs are used for both auxiliary and accelerated release reservoirs, and a single dual compartment reservoir is not used, as is illustrated in FIG. 1. The brake control valve 11 has both a service brake portion 17 and an emergency brake portion 16 mounted respectively on opposed sides of a pipe bracket 18 in a well-known manner and pneumatically connected to the appropriate respective tanks of the reservoir 13, also in a well-known manner. The dual compartment reservoir 13 and pipe bracket 18 are connected to supply air pressure to brake cylinders 19 located on the railway cars, only while flexible hose couplers 20 are connected to opposed ends of the brake pipe 12 and are employed to serially connect such brake pipes 12 to the brake pipes of adjacently disposed cars that will be mechanically connected to the brake pipe 12 disposed on the car under discussion. This brake system is exemplified by ABDX- and ABDW-type brake control valves, which are manufactured by the WABTEC Corporation and are well known in the railway brake control art.

Referring to FIGS. 2-9, one embodiment of a body 50 for a service portion of a brake pressure control valve is shown. The body 50 generally defines a piston passageway 51 axially extending from a top 52 of the body 50 to a bottom 53 of the body 50. The body 50 also defines an inshot valve passageway 54, a limiting valve passageway 55, and a service accelerated release (SAR) valve passageway 56 that each extend from the bottom 53 of the body 50 in a direction toward the top 52 of the body 50. The body 50 also defines a back-flow check valve passageway 57 generally extending from the top 52 of the body 50 towards the bottom 53 of the body 50. The body 50 further includes ECP porting 58 configured to receive an ECP coin plate (not shown), a release valve receiving surface 59 configured to engage a release valve (not shown), and a pipe bracket receiving surface 60 configured to receive a pipe bracket (not shown), such as a pipe bracket for a Chinese Type 120-1 control valve. The piston passageway 51 receives a main piston assembly made up of a service graduating valve 100 and a service slide valve 150 that are movable within a main bushing 70, all of which are discussed in further detail below. The limiting valve passageway 55 receives a brake cylinder limiting valve assembly (not shown). The inshot valve passageway 54 and the SAR valve passageway 56 receive an inshot valve (not shown) and SAR valve (not shown), respectively. The back-flow check valve passageway 57 receives a back-flow check valve assembly (not shown).

Figure 10:
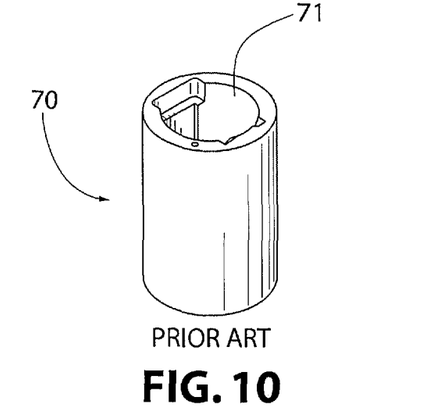
FIG. 10 is a perspective view of a main bushing according to one embodiment.
Figure 11:
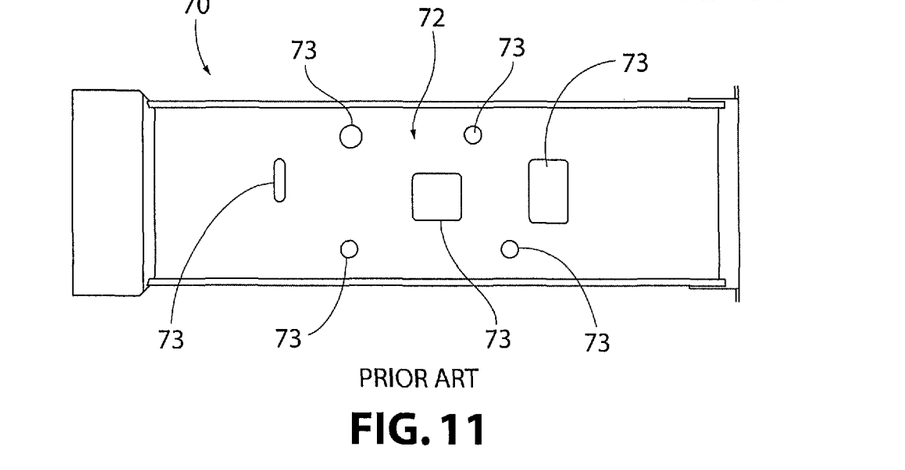
FIG. 11 is a schematic view of the specific ports in the slide valve seat of the main bushing shown in FIG. 10.

Referring to FIGS. 10 and 11, one embodiment of the main bushing 70 and its corresponding slide valve seat porting pattern 72 is disclosed. The main bushing 70 is received within the piston passageway 51 of the body 50 of the service portion and cooperatively engages a main piston assembly made up of the combined service graduating valve 100, service slide valve 150, and main piston (not shown). The main bushing 70 is generally cylindrical-shaped having a central passageway 71 for receiving the combined service graduating valve 100, service slide valve 150, and main piston. The bushing 70 defines a plurality of passages 73 to form the porting pattern 72, as shown in FIG. 11, which defines the slide valve seat of the bushing 70.

Referring to FIGS. 12-17, one embodiment of the service graduating valve 100 (hereinafter "grad valve") is shown. The grad valve 100 includes a bottom side 101, an opposing top side 102, and at least one other side, such as right side 103. According to one particular embodiment, the grad valve 100 has a six-sided rectangular box shape. The bottom side 101 of the grad valve 100 defines a face of the grad valve 100, which engages a corresponding seat on a top side of the slide valve 150, as will be discussed below, in order to establish a variety of porting connections between the grad valve 100 and the slide valve 150 for managing the flow of pressurized air through the body 50 of the service valve portion of a brake control valve. The bottom side 101 of the grad valve 100 includes a porting pattern made up of a plurality of openings and recesses defined in the bottom side 101 of the grad valve 100. The porting pattern includes a local reduction exhaust port 104 defined therein, which has a generally rectangular shape.

Figure 12:
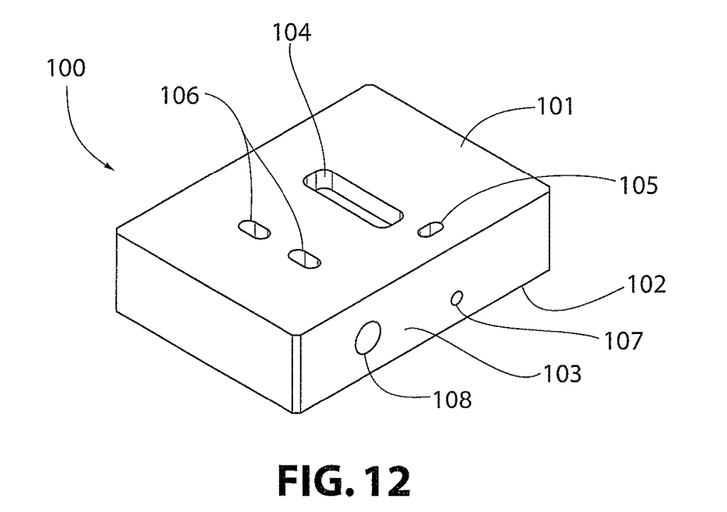
FIG. 12 is a perspective view of a service graduating valve according to one embodiment.
Figure 13:
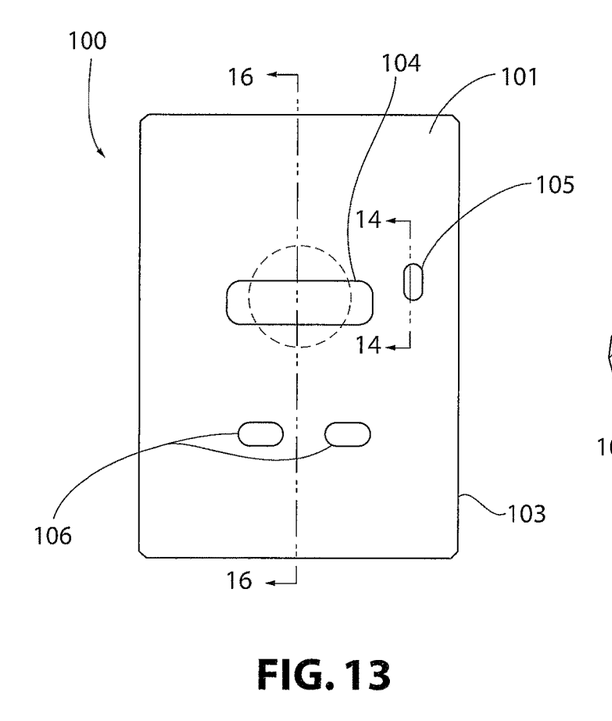
FIG. 13 is a bottom view of the service graduating valve shown in FIG. 12.
Figure 14:
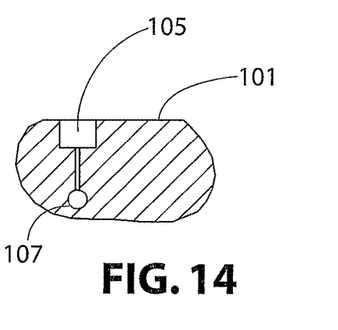
FIG. 14 is a partial cross-sectional view of the service graduating valve shown in FIG. 12 taken along line 14-14 in FIG. 13.
Figure 15:
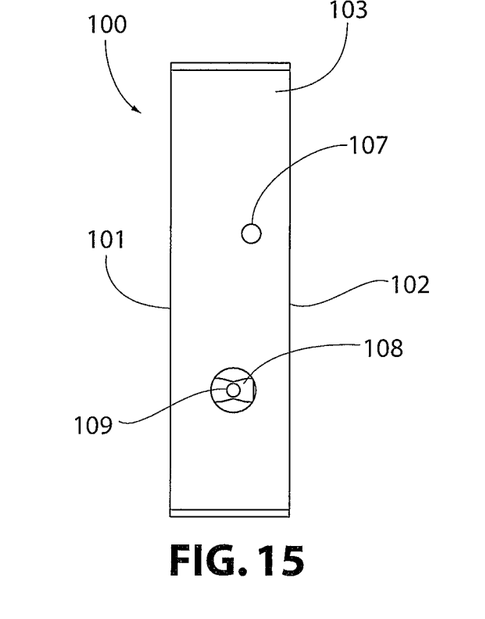
FIG. 15 is a right side view of the service graduating valve shown in FIG. 12.
Figure 16:
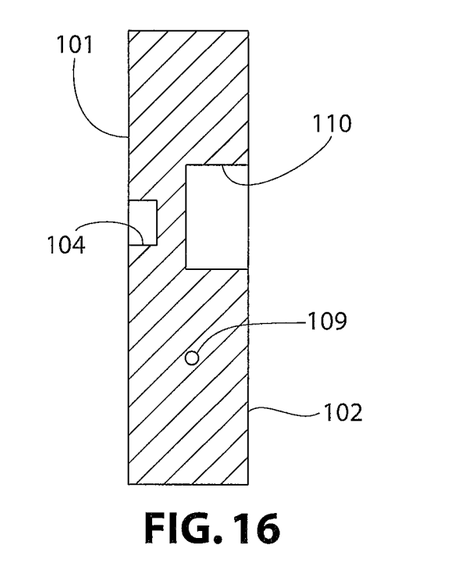
FIG. 16 is a cross-sectional view of the service graduating valve shown in FIG. 12 taken along line 16-16 in FIG. 13.
Figure 17:
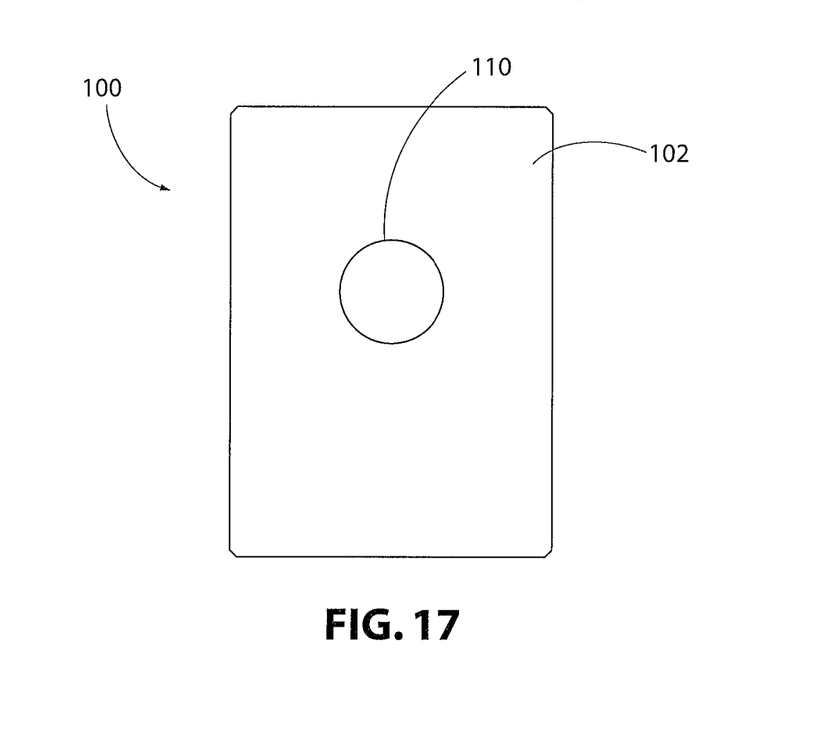
FIG. 17 is a top view of the service graduating valve shown in FIG. 12.
Figure 18:
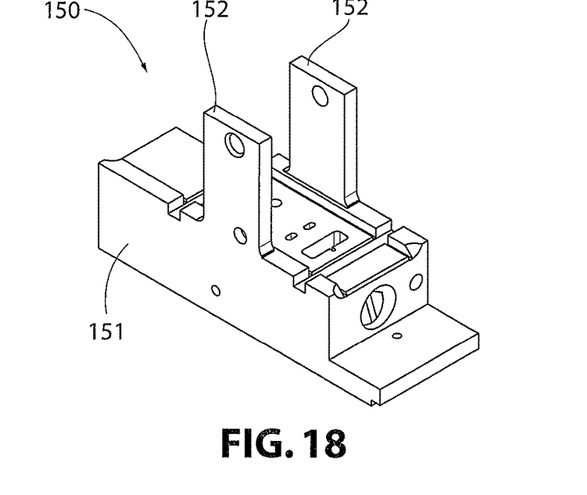
FIG. 18 is a perspective view of a service slide valve according to one embodiment.

The porting pattern of the bottom side 101 of the grad valve 100 also includes an accelerated release reservoir to auxiliary reservoir bleeder port 105, which, during a slight brake pipe over-reduction condition, allows pressure from the higher pressure accelerated release reservoir to flow into the auxiliary reservoir pressure while the slide valve remains in the full service position in order to move the grad valve 100 to its full service position on a grad valve seat 153 and, therefore, ensure positive shut down of the AAV function. The porting pattern of the bottom side 101 of the grad valve 100 further includes accelerated application valve (AAV) exhaust ports 106 with an internal choke passageway 109 connecting them. The AAV exhaust ports 106 perform only the AAV function in the grad valve 100 to vent brake pipe pressure to atmosphere, and do not have any effect with respect to the preliminary quick service function.

The right side 103 of the grad valve 100 has defined therein a passageway 107, which communicates the bleeder port 105 to the right side 103 of the grad valve 100, and a passageway 108, which communicates the AAV exhaust ports 106 and internal choke passageway 109 to the right side 103 of the grad valve 100 and is normally closed by a pressed-in plug (not shown) when the grad valve 100 is fully assembled. A generally circular-shaped recess 110, which receives a small coil spring (not shown) that is used for maintaining a positive engagement between the grad valve face 101 (shown in FIG. 12) and the grad valve seat 153 located in the top of the service slide valve 150 (shown in FIG. 19).

Referring to FIGS. 18-24, one embodiment of a service slide valve 150 (hereinafter "slide valve") is shown. The slide valve 150 includes a body 151 having a pair of extensions 152. A top side of the slide valve body 151 includes, in addition to other features, the grad valve seat 153 that directly engages the bottom side 101 of the grad valve 100 and includes a porting pattern made up of a plurality of openings and recesses defined in the top side of the slide valve body 151. The porting pattern of the grad valve seat 153 interacts with the porting pattern of the grad valve face 101 to establish the porting connections between the grad valve 100 and the slide valve 150.

Figure 19:
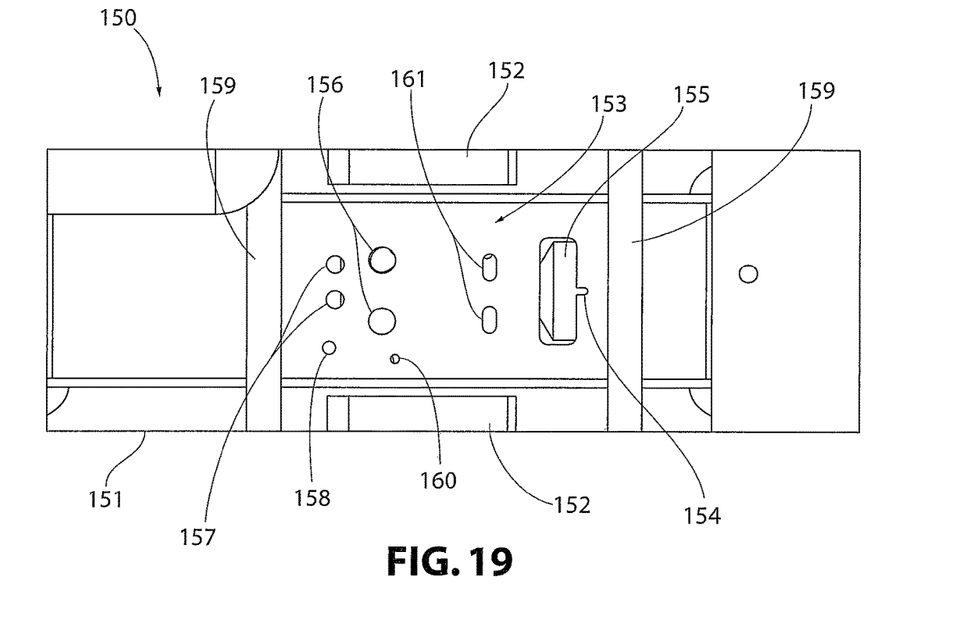
FIG. 19 is a top view of the service slide valve shown in FIG. 18.

As shown in FIG. 19, the porting pattern of the grad valve seat 153 includes an auxiliary reservoir to brake cylinder feed port 154 for slow brake pipe reductions and an auxiliary reservoir to brake cylinder feed port 155 for fast brake pipe reductions. The two auxiliary reservoir to brake cylinder feed ports 154, 155 are joined together. The porting pattern of the grad valve seat 153 also includes brake pipe to local reduction room ports 156 for performing the preliminary quick service function only, at least one and particularly two, as shown, auxiliary reservoir charging ports 157, and at least one accelerated release reservoir charging port 158, which also serves as an auxiliary reservoir to brake pipe weeper port. Wiper slots 159 for the front and rear sides of the grad valve 100 are also defined in the top side of the slide valve body 151 on either side of the grad valve seat 153.

The porting pattern of the grad valve seat 153 further includes an accelerated release reservoir port 160 to the grad valve seat 153, which provides accelerated release reservoir pressure to the bottom side 101 of the grad valve 100 in order to ensure positive shutdown of the AAV function when a slight brake pipe over-reduction condition exists. The porting pattern of the grad valve seat 153 also includes brake pipe to local reduction room ports 161, which are used in the AAV function only and provide a path from the brake pipe to the local reduction room in order to provide proper AAV function. The brake pipe to local reduction room ports 161 perform only the AAV function in the slide valve 150 to vent brake pipe pressure to atmosphere, and does not have any effect with respect to the preliminary quick service function.

Figure 20:
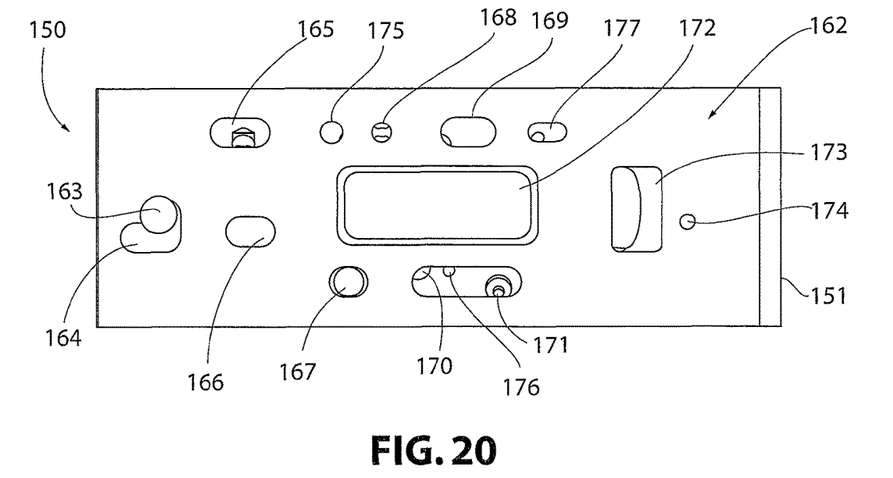
FIG. 20 is a bottom view of the service slide valve shown in FIG. 18.
Figure 21:
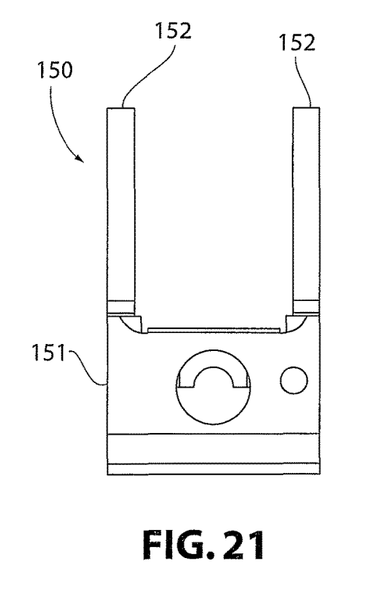
FIG. 21 is a rear view of the service slide valve shown in FIG. 18.
Figure 22:
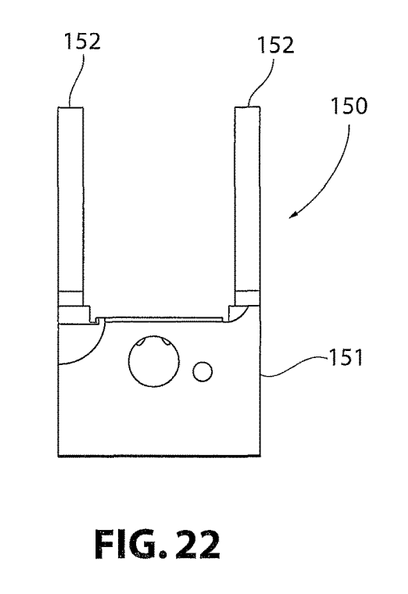
FIG. 22 is a front view of the service slide valve shown in FIG. 18.
Figure 23:
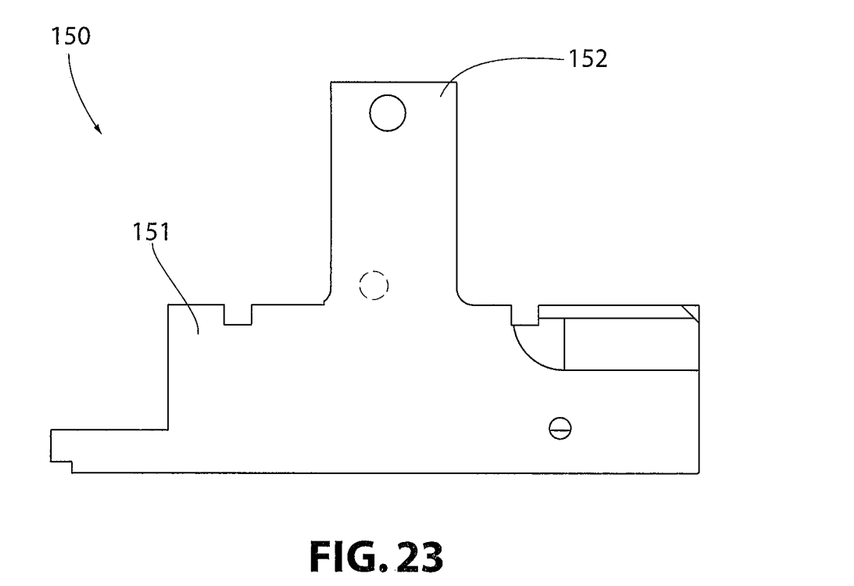
FIG. 23 is a right side view of the service slide valve shown in FIG. 18.
Figure 24:
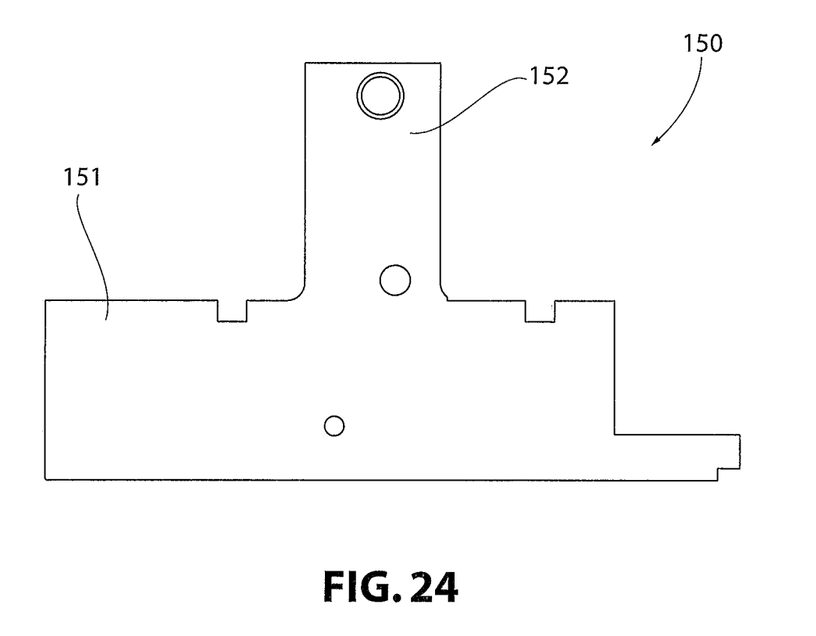
FIG. 24 is a left side view of the service slide valve shown in FIG. 18.

As shown in FIG. 20, a bottom side of the slide valve body 151 includes, in addition to other features, a service slide valve face 162 that directly engages with the interior slide valve seat of the main bushing 70 and includes a porting pattern made up of a plurality of openings and recesses defined in the bottom side of the slide valve body 151. The porting pattern of the service slide valve face 162 interacts with the porting pattern 72 of the main bushing 70 to establish proper porting connections between the slide valve 150 and the main bushing 70 in the assembly.

The porting pattern in the service slide valve face 162 includes a brake pipe to auxiliary reservoir charging port 163 for the release position, a brake pipe to auxiliary reservoir charging port 164 for the retarded recharge position, an auxiliary reservoir to accelerated release reservoir charging port 165, an auxiliary reservoir to brake pipe weeper port 166 while in the service position, a brake pipe to limiting valve port 167, an accelerated release reservoir to auxiliary reservoir port 168, which is activated when the slide valve 150 is in the boost position, a brake pipe pressure from the grad valve seat 153 down to a local reduction room exhaust port 169 for the preliminary quick service function, a brake pipe pressure from the slide valve seat up to a grad valve seat port 170 for the preliminary quick service function, a brake pipe to limiting valve port 171, a retainer exhaust port 172 (brake cylinder to atmosphere connecting port), an auxiliary reservoir to brake cylinder port 173, and an auxiliary reservoir to brake cylinder choke 174 if the slide valve 150 ever reaches jump position in the assembly.

The porting pattern in the service slide valve face 162 also includes an accelerated release reservoir to grad valve seat port 175, which interacts with the accelerated release reservoir port 160 in the grad valve seat 153 to direct accelerated release reservoir pressure to the grad valve seat 153 and the bottom side 101 of the grad valve 100 in order to ensure positive shutdown of the AAV function when a slight brake pipe over-reduction condition exists. The porting pattern in the service slide valve face 162 further includes a brake pipe pressure to grad valve seat port 176 for the AAV function and a brake pipe pressure from grad valve seat down to local reduction room port 177 for the AAV function, which are used in the AAV function only and provide a path from the brake pipe to the local reduction room in order to provide a proper AAV function. The brake pipe pressure to grad valve seat port 176 and the brake pipe pressure from grad valve seat down to local reduction room port 177 perform only the AAV function in the slide valve 150 to vent brake pipe pressure to atmosphere, and do not have any effect with respect to the preliminary quick service function.

It is to be appreciated that the grad valve 100 and the slide valve 150 are movable with respect to each other, and the slide valve 150 is movable in the main bushing 70, which occurs in the piston passageway 51 of the body 50. Accordingly, various flow passageways are opened through the service valve portion depending upon the relative position of the grad valve 100 and the slide valve 150 with respect to each other, and the main bushing 70 and the alignment of the various openings and recesses that define the porting patterns 72 of the main bushing 70, the service slide valve face 162, the grad valve seat 153, and the bottom side 101 of the grad valve 100. The service valve portion will perform various brake valve functions, which involve the movement of pressurized air between various locations within the brake line system, depending upon this relative positioning and alignment, including the AAV function and a positive shutdown of the AAV function when a slight brake pipe over-reduction condition exists. Accordingly, it is to be appreciated that the grad valve 100 and the slide valve 150 are mutually configured, along with the main bushing 70 and the rest of the service portion, to perform such operations. This type of system brake valve control, without the AAV function and positive shutdown of the AAV described above, is well known to those having ordinary skill in the art and is utilized in the Chinese Type 120-1 valves and in the ABDX- and ABDW-type brake control valves, which are manufactured by the WABTEC Corporation.

Although not shown, it is to be appreciated that the porting patterns in the grad valve seat 153 and the service slide valve face 162 are interconnected by a plurality of machined or drilled passages and chambers defined within the slide valve body 151 such that air pressure may be directed through the slide valve body 151 in varying manners depending upon the relative position of the grad valve 100 and the service slide valve 150 with respect to the main bushing 70 and the alignment of the respective porting patterns of all three individual parts.

While embodiments of a service graduating valve and service slide valve were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A service valve portion of a brake control valve, the service valve portion comprising:
  a body having a first side, a second side, a piston passageway defined therein extending from the top side to the bottom side, and a plurality of ports for connecting the service valve portion to at least one exhaust port, a brake pipe, at least one brake cylinder, a local reduction room, an accelerated release reservoir, and an auxiliary reservoir; and
  a main piston assembly movably disposed in the piston passageway of the service valve portion, the main piston assembly comprising:
    a service graduating valve having a body, the body of the service graduating valve including a first side having a porting pattern defined therein; and
    a service slide valve having a body, the body of the service slide valve including a first side with a graduating valve seat having a porting pattern defined therein and an opposing second side with a service slide valve face having a porting pattern defined therein,
  wherein the first side of the service graduating valve is configured to movably engage the graduating valve seat of the service slide valve to establish a variety of porting connections between the service graduating valve and the service slide valve based on the relative position of the service graduating valve and the service slide valve,
  wherein the service valve portion is controlled to perform brake valve functions based at least in part on the relative position of the service graduating valve and the service slide valve,
  wherein the porting pattern of the first side of the service graduating valve includes accelerated application valve exhaust ports and the porting pattern of the graduating valve seat of the service slide valve includes brake pipe to local reduction room ports that are configured to cooperate to allow the service valve portion to perform an accelerated application valve function,
  wherein the porting pattern of the first side of the service graduating valve includes an accelerated release reservoir to auxiliary reservoir bleeder port configured to direct compressed air to move the service graduating valve to discontinue the accelerated application valve function, and
  wherein the porting pattern of the graduating valve seat of the service slide valve includes an accelerated release reservoir port to the graduating valve seat configured to direct compressed air to the service graduating valve to discontinue the accelerated application valve function.

2. The service valve portion according to claim 1, wherein the porting pattern of the graduating valve seat of the service slide valve and the porting pattern of the service slide valve face of the service slide valve each include at least one port configured to allow the service valve portion to perform a preliminary quick service function.

3. The service valve portion according to claim 1, wherein the accelerated application valve exhaust ports of the porting pattern of the first side of the service graduating valve are connected by an internal choke passageway.

4. The service valve portion according to claim 1, wherein the porting pattern of the graduating valve seat of the service slide valve includes two connected auxiliary reservoir to brake cylinder feed ports.

5. The service valve portion according to claim 1, wherein the porting Pattern of the graduating valve seat of the service slide valve includes at least one auxiliary reservoir charging port and at least one accelerated release reservoir charging port, and wherein the at least one accelerated release reservoir charging port also serves as an auxiliary reservoir to brake pipe weeper port.

6. The the service valve portion according to claim 1, wherein the porting pattern of the service slide valve face includes a brake pipe to auxiliary reservoir charging port for a release position, a brake pipe to auxiliary reservoir charging port for a retarded recharge position, an auxiliary reservoir to accelerated release reservoir charging port, an auxiliary reservoir to brake pipe weeper port, a brake pipe to limiting valve port, an accelerated release reservoir to auxiliary reservoir port, a brake pipe pressure exhaust port, a brake pipe pressure to the graduating valve seat port, a retainer exhaust port, an auxiliary reservoir to brake cylinder port, an auxiliary reservoir to brake cylinder choke, an accelerated release reservoir to grad valve seat port, a brake pipe pressure to the graduating valve seat port for the accelerated application valve function, and a brake pipe pressure from the graduating valve seat down to local reduction room port for the accelerated application valve function.

7. The service valve portion according to claim 1, wherein the porting pattern of the first side of the body of the service graduating valve is made up of a plurality of openings and recesses defined in the first side of the body of the service graduating valve.

8. The service valve portion according to claim 1, wherein the porting pattern of the graduating valve seat of the service slide valve is made up of a plurality of openings and recesses defined in the first side of the body of the service slide valve.

9. The service valve portion according to claim 1, wherein the porting pattern of the service slide valve face of the service slide valve is made up of a plurality of openings and recesses defined in the second side of the body of the service slide valve.

10. The service valve portion according to claim 1, wherein the second side of the body of the service slide valve is configured to directly engage a main bushing.

11. A service valve portion of a brake control valve, the service valve portion comprising:
  a body having a first side, a second side, and a piston passageway defined therein extending from the top side to the bottom side;
  a main bushing, the main bushing including an interior slide valve seat having a porting pattern defined therein; and
  a main piston assembly movably disposed within the main bushing inside the piston passageway, the main piston assembly comprising:
    a service graduating valve having a body, the body of the service graduating valve including a first side having a porting pattern defined therein; and
    a service slide valve having a body, the body of the service slide valve including a first side with a graduating valve seat having a porting pattern defined therein and an opposing second side with a service slide valve face having a porting pattern defined therein, wherein the first side of the service graduating valve is configured to movably engage the graduating valve seat of the service slide valve to establish a variety of porting connections between the service graduating valve and the service slide valve based on the relative position of the service graduating valve and the service slide valve, wherein the second side of the service slide valve is configured to movably engage the interior slide valve seat of the main bushing to establish a variety of porting connections between the service slide valve and the main bushing based on the relative position of the service slide valve within the main bushing, wherein the service valve portion is controlled to perform brake valve functions based at least in part on the relative position of the service graduating valve and the service slide valve and the relative position of the service slide valve within the main bushing, wherein the porting pattern of the first side of the service graduating valve includes accelerated application valve exhaust ports, the porting pattern of the graduating valve seat of the service slide valve includes brake pipe to local reduction room ports, and the porting pattern of the service slide valve face of the service slide valve includes a brake pipe pressure to the graduating valve seat port and a brake pipe pressure from the graduating valve seat down to the local reduction room port that are configured to cooperate to allow the service valve portion to perform an accelerated application valve function, wherein the porting pattern of the first side of the service graduating valve includes an accelerated release reservoir to auxiliary reservoir bleeder port configured to direct compressed air to move the service graduating valve to discontinue the accelerated application valve function, and wherein the porting pattern of the graduating valve seat of the service slide valve includes an accelerated release reservoir port to the graduating valve seat and the porting pattern of the service slide valve face of the service slide valve includes an accelerated release reservoir to the graduating valve seat port configured to cooperate to direct compressed air to the service graduating valve to discontinue the accelerated application valve function.

12. The service valve portion according to claim 11, wherein the porting pattern of the graduating valve seat of the service slide valve and the porting pattern of the service slide valve face of the service slide valve each include at least one port configured to allow the service valve portion to perform a preliminary quick service function.

13. The service valve portion according to claim 11, wherein the accelerated application valve exhaust ports of the porting pattern of the first side of the service graduating valve are connected by an internal choke passageway.

14. The service valve portion according to claim 11, wherein the porting pattern of the graduating valve seat of the service slide valve includes two connected auxiliary reservoir to brake cylinder feed ports.

15. The service valve portion according to claim 11, wherein the porting pattern of the graduating valve seat of the service slide valve includes at least one auxiliary reservoir charging port and at least one accelerated release reservoir charging port, and wherein the at least one accelerated release reservoir charging port also serves as an auxiliary reservoir to brake pipe weeper port.

16. The service valve portion according to claim 11, wherein the porting pattern of the service slide valve face includes a brake pipe to auxiliary reservoir charging port for a release position, a brake pipe to auxiliary reservoir charging port for a retarded recharge position, an auxiliary reservoir to accelerated release reservoir charging port, an auxiliary reservoir to brake pipe weeper port, a brake pipe to limiting valve port, an accelerated release reservoir to auxiliary reservoir port, a brake pipe pressure exhaust port, a brake pipe pressure to the graduating valve seat port, a retainer exhaust port, an auxiliary reservoir to brake cylinder port, an auxiliary reservoir to brake cylinder choke, an accelerated release reservoir to grad valve seat port, a brake pipe pressure to the graduating valve seat port for the accelerated application valve function, and a brake pipe pressure from the graduating valve seat down to local reduction room port for the accelerated application valve function.

17. The service valve portion according to claim 11, wherein the porting pattern of the first side of the body of the service graduating valve is made up of a plurality of openings and recesses defined in the first side of the body of the service graduating valve.

18. The service valve portion according to claim 11, wherein the porting pattern of the graduating valve seat of the service slide valve is made up of a plurality of openings and recesses defined in the first side of the body of the service slide valve.

19. The service valve portion according to claim 11, wherein the porting pattern of the service slide valve face of the service slide valve is made up of a plurality of openings and recesses defined in the second side of the body of the service slide valve.

* * * * *

UNITED STATES PATENT AND TRADEMARK OFFICE
CERTIFICATE OF CORRECTION

PATENT NO. : 9,616,872 B2  Page 1 of 1
APPLICATION NO. : 14/397281
DATED : April 11, 2017
INVENTOR(S) : Jeffrey B. Skweres et al.

It is certified that error appears in the above-identified patent and that said Letters Patent is hereby corrected as shown below:

On the Title Page

Column 1, under Related U.S. Application Data, insert Item -- (60) Provisional Application No. 61/644,106, filed on May 8, 2012 --

Signed and Sealed this
Thirteenth Day of June, 2017

Joseph Matal
*Performing the Functions and Duties of the
Under Secretary of Commerce for Intellectual Property and
Director of the United States Patent and Trademark Office*